Figure 1:
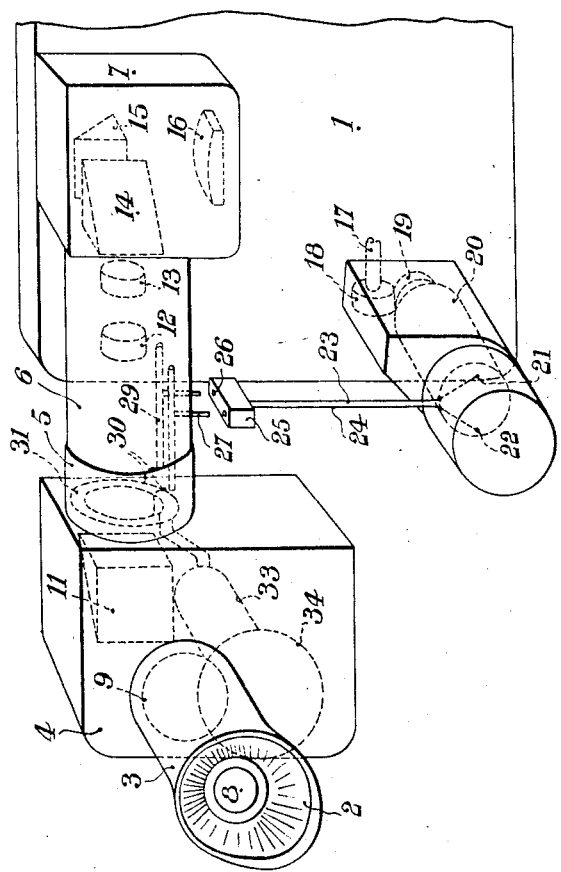

March 1, 1960 A. C. COUTANT ET AL 2,926,560
MOTION PICTURE CAMERA WITH FILM FEEDING
INDICATION IN THE VIEW FINDER
Filed Dec. 21, 1953 2 Sheets-Sheet 2

United States Patent Office 2,926,560
Patented Mar. 1, 1960

2,926,560

MOTION PICTURE CAMERA WITH FILM FEEDING INDICATION IN THE VIEW FINDER

André Clement Coutant and Jacques Mathot, Paris, France

Application December 21, 1953, Serial No. 399,356

Claims priority, application France December 24, 1952

1 Claim. (Cl. 88—16)

The present invention relates in general to motion-picture cameras and more particularly to improvements in or relating to apparatus of this type.

In making instructional or outdoor films it is necessary to use portable cameras, and the operator is compelled to move about a lot and work very fast, frequently in uncomfortable or unusual positions.

Certain cameras utilized in this and other fields are equipped with devices for measuring the shooting or film speed, but with this arrangement the operator must adjust the device beforehand; this is attended by the inevitable loss of a few yards of film and by the inconvenience that it is not possible to vary the film speed during the shooting; at any rate, the operator is unable to control this variation without interrupting the filming of a subject or scene, whilst in many cases it would be advantageous to switch from a normal speed to a higher speed (or vice-versa) without any break in the shooting.

Now it is the essential object of the present invention to provide, as a novel industrial product, a motion-picture camera combined with a device for measuring the film speed or frame frequency, wherein the film speed graduation and the index, of which the relative positions indicate the frame frequency, are visible in the field of vision of the magnifying lens of the view-finder of the camera; consequently, the operator can check the film speed and change it at any time, and also check the modification brought thereto, while continuing to sight the scene being shot.

According to a preferred embodiment of the invention, the arrangement comprises a small electric generator rotatably driven from the film feeding mechanism and generating a direct current constantly proportional to the speed at which the generator is being driven, this generator being electrically connected to a galvanometer positioned within and movable bodily with the magnifying lens of the view-finder, the shaft of said galvanometer being rotatably fast with a transparent disc having a graduated marginal portion oscillating within the field of the lens in front of an index, the arrangement being so adjusted that the graduation line registering with said index will indicate the film speed.

Preferably, this disc will oscillate behind the field lens and the index will consist of a line engraved on the lens itself.

Preferably also, the graduation will appear in the lower portion of the picture frame so that it cannot interfere with any detail of the scene being filmed.

Figure 2:
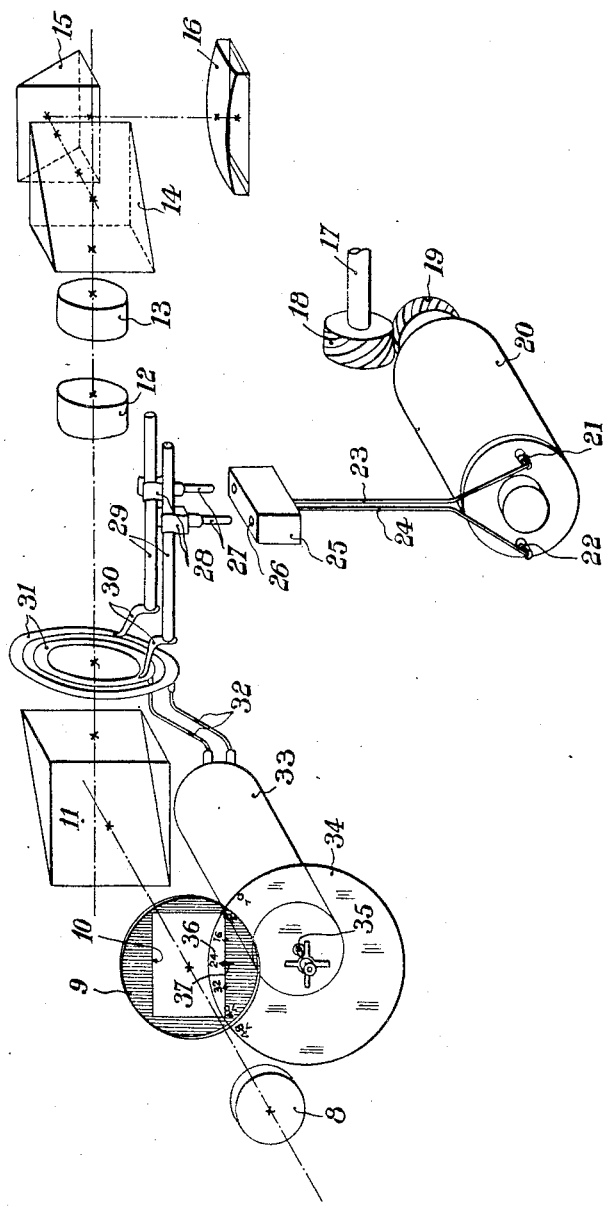

The accompanying drawings forming part of this specification illustrate diagrammatically by way of example one form of embodiment of the invention. In the drawings:

Figure 1 is a perspective view showing one portion of a motion-picture camera, and more particularly the view-finding means thereof, equipped with the improved arrangement of this invention; and Figure 2 is an exploded, perspective view showing at a greater scale the main components of the view-finder and the manner in which it is combined with the film-speed control means of this invention.

The motion-picture camera 1 shown in the drawings comprises an eyepiece shade 2 fitted at the free end of a cylindrical tube 3 containing the finder and secured on one face of a casing 4 in which an angular prism is positioned; on another face of this block 4 there is secured a socket 5 adapted to rotate on and, if desired, to slide along another cylindrical tube 6 rigid with another casing 7 containing a system of prisms receiving the light rays transmitted through the shutter mirror, if a view-finder of the reflex type is used.

In the main casing constituted by tube 3, casing 4, socket 5, tube 6, casing 7 there are arranged as usual (as shown in Fig. 2) a magnifying lens 8, a field lens 9 on which the contour of the image 10 appears, an eyepiece prism 11, a movable body-tube 12 and a stationary body-tube 13, a vehicle prism 14, a ground-glass prism 15 and a ground glass proper 16 on which the same image as on the film will be formed.

The main shaft 17 of the motion-picture camera 1 is rotatably fast with a helical gear 18 meshing with another helical gear 19 keyed on the shaft of a permanent-magnet generator 20.

The terminals 21 and 22 of this generator are connected through flexible conductors 23, 24 to a female plug connector 25 having two sockets 26 adapted to engage corresponding contact pins 27 as shown; each pin 27 is rigid with a runner 28 adapted to slide along a movable conducting rod 29; besides, each rod 29 carries at one end a contact brush 30 each engaging one of a pair of conducting slip rings 31 rotatably fast with the movable assembly and disposed concentrically to the vehicle but outside the field; these conducting slip rings are connected through wires 32 to a screened galvanometer 33 adapted to transmit its oscillations to a dial 34 rigid with the shaft 35 of this galvanometer; the dial 34 may consist of transparent plastic material so as to be extremely light, and a graduation 36 may be marked on its peripheral margin to register with an index line 37 engraved on the field lens 9.

The oscillating dial 34 assumes an angular position which is a function of the current supplied by the generator 20 to the galvanometer and therefore of the velocity of rotation of the main shaft of the apparatus.

From the foregoing it will be readily apparent that the operator, without diverting his attention from the subject being photographed, which he sees in the frame 10 of the field lens 9, is able at any time to check the film speed, expressed in frames per second, indicated by the relative positions of graduation 36 and index 37.

Of course, while the above description and the attached drawings refer to a specific form of embodiment of the invention, it will be readily understood by anybody conversant with the art that many modifications as to the type, size, proportions and relative disposition of the parts involved may be made, without however departing from the spirit and scope of the invention as defined in the claim.

What we claim is:

A motion picture camera comprising a viewfinder, a lens through which the operator may see the image to be photographed, a small generator rotatably driven from the film driving mechanism and adapted to produce an electric direct current proportional to its speed, a galvanometer connected to said generator, a disk rotatably fast with the galvanometer shaft, graduations formed on the peripheral edge of said disk which correspond to the film-feeding speed, a fixed mark operatively associated with said graduations, the disk periphery being located within the field of said lens, a first casing containing said lens, an eyepiece shade and a tube connected to the casing for viewing said lens, an angular prism in said casing and a socket connected to said casing, said lens, said shade, said tube, said prism and said socket defining with said casing a movable unit wherein the light rays enter through said socket, are reflected in said angular prism and finally pass through said lens and eyepiece, said apparatus further comprising a second tube receiving the light rays from the image to be viewed, said socket fitting over said second tube whereby said movable unit is adapted to be pivoted about the axis of said second tube, a pair of conductive rods disposed within said second tube and connected electrically to said generator, a pair of conductive slip rings located within said socket and concentrically thereto outside the field of said viewfinder, a pair of brushes each electrically connected to one of said conductive rods and in frictional engagement with one of said slip rings, said galvanometer and the disk rotatably fast therewith being located within said casing, and second conductive rods electrically connecting said conductive slip rings to said galvanometer.

References Cited in the file of this patent

UNITED STATES PATENTS

| | | |
|---|---|---|
| 1,719,377 | Kosken | July 2, 1929 |
| 1,858,792 | Merle | May 17, 1932 |
| 2,419,706 | Contner | Apr. 29, 1947 |

FOREIGN PATENTS

| | | |
|---|---|---|
| 198,427 | Switzerland | Sept. 16, 1938 |